3,247,902
PREVENTION OF EMULSION FORMATION IN CRUDE OIL PRODUCTION
Hendrik K. van Poollen, Littleton, Colo., assignor to Marathon Oil Company, Findlay, Ohio, a corporation of Ohio
No Drawing. Filed Nov. 13, 1962, Ser. No. 237,355
15 Claims. (Cl. 166—42)

My invention relates to the production of petroleum crudes and more particularly to a process for ameliorating the problems associated with emulsions formed in the production of petroleum crudes.

At the present time de-emulsifiers are used to break emulsions. In one procedure, the emulsions are broken by the addition of a de-emulsifier to the emulsion when the crude is passed through the heater treater. In another process, liquid de-emulsifiers are pumped into the well to break the emulsion as the petroleum is pumped to the surface.

In still another process, a liquid de-emulsifier is forced into the formation surrounding the well bore. This process is subject to a serious disadvantage in that it can oil wet the formation adjacent the bore hole. Oil wetness adversely affects the oil-water recovery ratio and thereby decreases the recovery efficiency.

I have now discovered that emulsion formation can be substantially prevented, or entirely eliminated, by dispersing a solid emulsion-resolving agent within the formation from which crude is being produced. This process is highly advantageous in that once formed, emulsions are oftentimes quite difficult to break. Heat is generally required. High viscosity emulsions require excessive power for their transportation and to effect mixing with de-emulsifiers. A further problem sometimes arises in that, in special cases, it is difficult to dissolve the de-emulsifier in an emulsion for mixing into the "cut" or "roily" oils.

The prcoess of my invention can be utilized in conjunction with a propping agent in a hydraulic fracturing process or the fracturing technique can be utilized to disperse the emulsion-resolving agent without the use of a propping agent, or used merely to disperse an emulsion-resolving agent within a naturally, or otherwise fractured formation.

In one embodiment of the process of my invention, particles of solid emulsion-resolving agents are sized and mixed with propping sand in the same size ranges until a uniform distribution is obtained. The mixture of resolving agent and propping sand is then suspended in a carrier fluid and pumped, under pressure, into a fracture formation. The pressure is then reduced at a rate such that the resolving agent and propping sand remain dispersed within the confines of the fractured area of the formation. In the usual application, the mixture of resolving agent and propping sand in a carrier fluid is forced into the formation after a slug of fluid has been injected into the formation at fracturing pressures to fracture the formation and thereby provide fissures through which the mixture of resolving agent and propping sand can be distributed. In formations which are naturally fractured, this step is not necessary.

In another embodiment of the process of my invention, the resolving agent is not mixed with a propping sand prior to suspension in a carrier fluid.

In some instances it will be advantageous to push the emulsion-resolving agent far into the formation by following the resolving agent-carrier slug with a further slug of carrier material, thereby insuring the formation of minimum amounts of emulsions within the formation.

Many types of solid emulsion-resolving agents are known which are useful in the process of my invention. Typical petroleum emulsion breaking compounds, useful in my process, are solid resolving agents of the type described in United State Patents 2,792,352 and 2,885,367 and prepared according to the process of United States Patents 3,057,891. Generally, the pelletized solid resolving agents should have a size range from a minimum of about 40–60 mesh and a maximum of about 6–8 mesh. A 20–40 mesh size range is useful in most instances.

The type and quantity of emulsion-resolving agent utilized will vary with the size of the fractured area to be filled, the productivity of the well, the types of emulsifiers in the formation fluids, and the temperature of the formation. Depending upon the emulsion-resolving agent utilized, from about 10 to about 100 p.p.m. emulsion-resolving agent in solution in the crude are adequate to accomplish a desired reduction in emulsion formation.

The emulsion-resolving pellets should be practically insoluble in the formation fluids to provide a desired degree of emulsion prevention over a long period of time as they slowly dissolve within the formation. The resolving agent is utilized at a rate which roughly corresponds to the petroleum production rate, i.e., the substantially insoluble resolving agent dissolves in the formation fluids substantially to the extent that resolving agent-unsaturated formation fluids are brought into contact with the inhibitor.

From the foregoing description, it is apparent that this invention may be practiced with a wide selection of chemicals as to the resolving agents used, and the quantity of resolving agent used may vary substantially according to the requirements of a given treatment. Changes and modifications may be availed of within the spirit and scope of the invention set forth in the following example and appended claims.

*Example 1*

A well producing 114 bbls./day of a 34° crude from a 28-foot sand is treated to reduce emulsion formation. Two hundred and fifty pounds of 10–20 mesh particles of an oxyalkylated phenol-aldehyde resin prepared from a mixture of p-isopropylphenol and tertiarybutylphenol and formaldehyde treated with propylene oxide is suspended in crude and, following the injection of a slug of crude containing no resin, injected into the formation at a pressure sufficient to lift the over-burden. Crude pumped from the formation has an initial resin concentration in excess of 100 p.p.m. and a concentration in excess of 50 p.p.m. for a number of months.

Now having described my invention, what I claim is:
1. The process of preventing the formation of emulsions in hydrocarbon fluid production from subterranean hydrocarbon-bearing formations comprising
 (a) suspending particles composed substantially entirely of emulsion-resolving agent, slightly soluble in all the formation liquids, in a carrier fluid;
 (b) injecting the suspension of emulsion-resolving agent in the carrier fluid into a subterranean formation through a well drilled therein to disperse the emulsion-resolving agent within the formation;
 (c) depositing the dispersed emulsion-resolving agent within the formation; and
 (d) recovering the hydrocarbon fluids from the formation.

2. The process of claim 1 wherein the particules of emulsion-resolving agent are mixed with a propping agent prior to being suspended in a carrier fluid.

3. The process of claim 1 wherein the particles of emulsion-resolving agent are of a size range of from about 40–60 mesh to about 6–8 mesh.

4. The process of substantially eliminating emulsion formation in crude hydrocarbon production comprising injecting particles composed substantially entirely of emulsion-resolving agent, suspended in a carrier material, said carrier material being under pressure sufficient to part the subterranean formation from which crude hydrocarbon is to be produced, into a subterranean hydrocarbon fluid bearing formation through a well drilled therein, said agent being only slightly soluble in all the formation liquids; and recovering hydrocarbon fluids from the formation.

5. The process of claim 4 wherein the carrier fluid is a petroleum hydrocarbon and the particles of emulsion-resolving agent are of a size ranging from about 40–60 mesh to about 6–8 mesh.

6. The process of claim 4 wherein the particles of emulsion-resolving agent are distributed within the formation remote from the injection well be injecting, subsequent to the injection of the suspension of emulsion-resolving agent in the carrier material.

7. The process of claim 4, wherein the injection of the suspension of particles of emulsion-resolving agent in carrier fluid is preceded by the injection of a slug of carrier fluid.

8. The process of claim 4 wherein the injection of the suspension of particles of emulsion-resolving agent in carrier fluid is both preceded and followed by the injection of slugs of carrier fluid.

9. The process of reducing emulsion formation in the removal of hydrocarbons from subterranean formations having a well drilled therein comprising
   (a) suspending pellets composed substantially entirely of emulsion-resolving agents substantially insoluble in a carrier fluid and only slightly soluble in all the formation liquids;
   (b) delivering the suspended pellets through a well bore to the formation;
   (c) fracturing the formation by increasing the pressure on the carrier fluid to a degree sufficient to part the formation and force the emulsion-resolving agent suspended in the carrier fluid into the formation, whereby the emulsion-resolving agent is distributed through said formation outwardly from said well; and
   (d) withdrawing the formation fluids from the formation through the well to induce a slow dissolution of the pellets by contact with the formation liquids.

10. The process of claim 9 wherein the size range of the emulsion-resolving agent is from about 20 to about 40 mesh.

11. The process of preventing the formation of emulsions in hydrocarbon fluid production from subterranean hydrocarbon-bearing formations comprising:
   (a) suspending particles of emulsion-resolving agents, slightly soluble in all the formation liquids, in a carrier fluid;
   (b) injecting the suspension of particles in the carrier fluid into a subterranean formation through a well drilled therein to disperse the particles in fractures the formation;
   (c) depositing the dispersed particles within the formation;
   (d) dissolving entirely a plurality of said particles at a rate substantially equivalent to the hydrocarbon fluid production rate; and
   (e) recovering the hydrocarbon fluids from the formation.

12. A process as in claim 11 wherein the emulsion-resolving agents are of differing solubilities.

13. A process for substantially eliminating the formation of emulsions in the production of hydrocarbons from subterranean formations comprising;
   (a) treating a portion of the formation fluids within the fractures of the formation with particles composed entirely of at least one emulsion-resolving agent slightly soluble in all the formation liquids;
   (b) dissolving entirely a plurality of said particles as formation fluids unsaturated in emulsion-resolving agent come into contact with the particles; and
   (c) recovering the hydrocarbon fluids from the formation.

14. A process for substantially preventing the formation of emulsions in the production of hydrocarbons from subterranean formations comprising:
   (a) contacting a portion of the formation fluids within the fractures of the formation with particles formed in a non-sorptive process from at least one emulsion-resolving agent slightly soluble in all the formation liquids;
   (b) dissolving the slightly soluble portion of the particles over a period of time as the formation liquids unsaturated in emulsion-resolving agent are brought into contact with the slightly soluble portions of the pellets; and
   (c) recovering the hydrocarbon fluids from the formation.

15. A process of substantially eliminating the formation of emulsions in the production of hydrocarbons from a subterranean formation comprising:
   (a) suspending particles formed in a non-sorptive process from at least one emulsion-resolving agent slightly soluble in all the formation liquids, in a carrier fluid;
   (b) injecting the suspension of particles in the carrier fluid into a subterranean formation through a well drilled therein to disperse the particles within the formation;
   (c) depositing the dispersed pellets within the formation;
   (d) dissolving the slightly soluble portion of the particles over a period of time as the formation fluids unsaturated in emulsion-resolving agent come into contact with the pellets; and
   (e) recovering the hydrocarbon fluids from the formation.

References Cited by the Examiner

UNITED STATES PATENTS

| | | | |
|---|---|---|---|
| 1,223,659 | 4/1917 | Barnickel | 252—330 |
| 1,593,893 | 7/1926 | Barry | 252—330 X |
| 2,167,327 | 7/1939 | Talley | 252—330 |
| 2,761,563 | 9/1956 | Waterman | 252—330 |
| 2,846,011 | 8/1958 | Miller | 166—42 |
| 2,881,837 | 4/1959 | Staudt | 166—42.1 X |
| 2,946,747 | 7/1960 | Kirkpatrick | 166—42 |
| 3,021,901 | 2/1962 | Earlougher | 166—42 |
| 3,066,732 | 12/1962 | McEver | 166—42.1 X |
| 3,173,484 | 3/1965 | Huiett et al | 166—42.1 X |
| 3,179,170 | 4/1965 | Burtch et al | 166—42.1 |

CHARLES E. O'CONNELL, *Primary Examiner.*

C. H. GOLD, T. A. ZALENSKI, *Assistant Examiners*